United States Patent
Harper (10) Patent No.: US 11,598,156 B2
(45) Date of Patent: Mar. 7, 2023

(54) INSTALLING SUBSEA RISERS

(71) Applicant: Subsea 7 Limited, Sutton (GB)

(72) Inventor: Lewis Alexander Harper, Cove (GB)

(73) Assignee: Subsea 7 Limited, Sutton (GB)

( * ) Notice: Subject to any disclaimer, the term of this patent is extended or adjusted under 35 U.S.C. 154(b) by 0 days.

(21) Appl. No.: 17/419,241

(22) PCT Filed: Dec. 23, 2019

(86) PCT No.: PCT/GB2019/053699
§ 371 (c)(1),
(2) Date: Jun. 28, 2021

(87) PCT Pub. No.: WO2020/136378
PCT Pub. Date: Jul. 2, 2020

(65) Prior Publication Data
US 2022/0042378 A1  Feb. 10, 2022

(30) Foreign Application Priority Data
Dec. 28, 2018  (GB) ..................... 1821311

(51) Int. Cl.
*F16L 1/14* (2006.01)
*F16L 1/16* (2006.01)
(Continued)

(52) U.S. Cl.
CPC .......... *E21B 17/015* (2013.01); *E21B 17/017* (2013.01); *E21B 43/0107* (2013.01);
(Continued)

(58) Field of Classification Search
CPC ......... F16L 1/14; F16L 1/165; E21B 43/0107; E21B 41/007
(Continued)

(56) References Cited

U.S. PATENT DOCUMENTS 4,363,566 A   12/1982  Morton
4,588,326 A   5/1986   Langner
(Continued)

FOREIGN PATENT DOCUMENTS

GB   2 394 522   4/2004
GB   2537360     10/2016
(Continued)

OTHER PUBLICATIONS

ANSI/API Specification 17J, "Specification for Unbonded Flexible Pipe," 3d ed. 2008.
(Continued)

*Primary Examiner* — Sunil Singh
(74) *Attorney, Agent, or Firm* — Levy & Grandinetti (57) ABSTRACT

A subsea riser is installed by lowering at least one riser conduit to the seabed when piggybacked to an elongate support that comprises at least one flowline. The elongate support may be a pipeline bundle, which may be attached to one or more towheads in a towable bundle unit. The riser conduit may be in fluid communication with the flowline. At the seabed, a free end portion of the riser conduit is detached from the elongate support by releasing subsea-releasable fastenings. Then, with the elongate support and a root end of the riser remaining at the seabed, the detached free end portion of the riser conduit is lifted away from the elongate support to a riser support, such as a platform, an FPSO (floating production, storage and offloading vessel), or a buoy.

24 Claims, 8 Drawing Sheets

(51) Int. Cl.
  *E21B 17/01*  (2006.01)
  *E21B 43/01*  (2006.01)
  *F16L 1/24*  (2006.01)

(52) U.S. Cl.
  CPC .................. *F16L 1/14* (2013.01); *F16L 1/165* (2013.01); *F16L 1/24* (2013.01)

(58) Field of Classification Search
  USPC ......... 405/169, 170; 166/338, 344, 367, 359
  See application file for complete search history.

(56) References Cited

U.S. PATENT DOCUMENTS

| | | |
|---|---|---|
| 4,793,737 A | 12/1988 | Shotbolt |
| 7,559,721 B2 | 7/2009 | Brown |
| 7,628,568 B2 | 12/2009 | Critsinelis |
| 8,596,913 B2 | 12/2013 | Li |
| 10,180,200 B2 | 1/2019 | Hoyvik |

FOREIGN PATENT DOCUMENTS

| | | |
|---|---|---|
| WO | WO 03/002848 | 1/2003 |
| WO | WO 2007/127684 | 11/2007 |
| WO | WO 2008/094932 | 8/2008 |
| WO | WO 2010/093577 | 8/2010 |
| WO | WO 2017/043315 | 3/2017 |

OTHER PUBLICATIONS

API Specification 5L, "Specification for Line Pipe," 45th ed. 2012.
API Recommended Practice 17B, "Recommended Practice for Flexible Pipe," 5th ed. 2014.
API Recommended Practice 1111, "Design, Construction, Operation, and Maintenance of Offshore Hydrocarbon Pipelines (Limit State Design)," 5th ed. 2015.

INSTALLING SUBSEA RISERS

BACKGROUND OF THE INVENTION

This invention relates to the installation of subsea risers as used in the subsea oil and gas industry.

Subsea risers are used to convey hydrocarbon production fluids from the seabed to the surface and conversely to convey other fluids from the surface to the seabed, such as water for injection into a subsea well. The invention aims to simplify the installation of such risers and in particular to make the installation process quicker, noting that any delays will add to the very high cost of vessel time and may risk missing an available weather window.

A common riser comprises a rigid pipeline that hangs freely as a catenary from a floating upper support such as an FPSO (floating production, storage and offloading) vessel, a platform or a buoy. A supporting buoy may, for example, be held by tethers at a sub-surface position from which jumper pipes extend to a surface installation such as an FPSO vessel or a platform.

Most conventionally, a free-hanging catenary riser of rigid pipe is made of steel, hence being known in the art as a steel catenary riser or SCR. In this respect, those skilled in the art know that nominally rigid pipes are not devoid of flexibility. However, whilst they have flexibility, 'rigid' pipes do not fall within the definition of 'flexible' pipes as understood in the art.

Conventional rigid pipes used in the subsea oil and gas industry are specified in the American Petroleum Institute (API) Specification 5L and Recommended Practice 1111. A rigid pipe usually consists of, or comprises, at least one pipe of solid steel or steel alloy. However, additional layers of other materials can be added, such as an internal liner layer or an outer coating layer. A rigid pipe may also have a concentric pipe-in-pipe (PiP) structure. Rigid pipe joints are terminated by a bevel, a thread or a flange, and are assembled end-to-end by welding, screwing or bolting them together to form a pipe string or pipeline.

Repetitive or oscillatory motion generates fatigue in a riser conduit that may, over time, cause its failure and rupture. Consequently, a simple free-hanging rigid riser such as an SCR may not be technically viable for some more challenging projects, especially in dynamic environments that will often suffer from high sea states and strong currents.

Other solutions may therefore be appropriate to construct subsea risers in those situations, for example using flexible pipes, pipes of composite materials and more complex riser configurations.

Flexible pipes used in the subsea oil and gas industry are specified in API Specification 17J and Recommended Practice 17B. The pipe body is composed of a composite structure of layered materials, in which each layer has its own function. Typically, polymer tubes and wraps ensure fluid-tightness and thermal insulation, whereas steel layers or elements provide mechanical strength.

Bonded flexible pipes comprise bonded-together layers of steel, fabric and elastomer but can only be manufactured in short lengths in the order of tens of metres. Such pipes are therefore apt to be used as jumper pipes in hybrid buoy-supported risers that suspend riser conduits from a sub-surface buoy, or in hybrid riser towers in which an upright riser column is held in tension between a sub-surface buoy and a subsea foundation. Conversely, fully-flexible risers of unbonded flexible pipe can be manufactured in lengths of hundreds of metres and so are long enough to reach from the seabed to the surface.

In recent years, the subsea oil and gas industry has also begun to adopt rigid pipes of polymer composite materials in place of steel. Composite pipes have a tubular load-bearing structure that is principally of composite materials. This is to be distinguished from pipes having a composite structure, such as the various layered configurations of rigid and flexible pipes mentioned above.

Typically, a composite pipe comprises a polymer resin matrix reinforced by fibres such as glass fibres or carbon fibres. The polymer matrix may be of thermoplastic or thermoset materials. The former results in what is known in the art as thermoplastic composite pipe or, more simply, as thermo-composite pipe, known by the acronym TCP.

TCP is classed as a bonded composite pipe. It has a solid, monolithic structure comprising a polymer liner, a polymer composite matrix and an optional outer coating that may also be of polymer. The polymer of the liner, the matrix and/or the coating may, for example, be of polypropylene. The matrix is a true composite reinforced with fully-embedded reinforcing fibres.

In an alternative or additional approach to reducing fatigue, a riser may be shaped to impart compliance by adding localised buoyancy and/or weights and/or subsea supports to modify the curvature of the riser and, in particular, to introduce points of inflection.

Risers are often installed separately from subsea flowlines. This requires a dedicated bottom structure to be installed on the seabed at the end of a flowline to allow for subsequent connection of the riser. In addition to the cost of the bottom structure and the creation of undesirable discontinuities in the system, these successive installation and connection operations take more vessel time and so cost a lot of money.

Where there is a single flowline, a riser may be installed in continuity with the flowline. In that case, the flowline is laid on the seabed and then the same installation vessel installs the riser pre-connected to the flowline. Where the flowline is of a flexible pipe, the riser may be of the same flexible pipe as the flowline, although sometimes the riser may have additional reinforcement. A flexible pipe is typically unspooled from a reel-lay vessel as disclosed in U.S. Pat. No. 4,793,737. Where the flowline is a rigid pipeline, the riser section may be installed on the seabed and then pulled up to the surface as taught by WO 2010/093577 and WO 2008/094932.

In the case of a towed single flowline, WO 2007/127684 teaches a riser and flowline assembly with the riser pre-connected to the flowline. The assembly is towed with the riser extending through the water column. This increases the risk of fatigue and so requires bespoke design of the system and careful planning and control of the towing operation.

WO 2017/043315 describes a structure for supporting a riser. The structure is attached to a floating installation and includes upper and lower support portions.

In U.S. Pat. No. 4,588,326, a flowline and a riser, deployed from separate vessels, are connected by a pull cable and lowered to the sea floor. The riser and flowline are then attached to a subsea structure using a connection tool.

BRIEF SUMMARY OF THE INVENTION

Against this background, the invention resides in a method of installing a subsea riser. The method comprises: lowering at least one riser conduit to a seabed location when piggybacked to an elongate support that comprises at least one flowline; at the seabed location, detaching a free end of the riser conduit from the elongate support; and while leaving the elongate support and a root end of the riser conduit at the seabed location, lifting the detached free end of the riser conduit away from the elongate support to a riser support that is positioned at or near to the surface of the sea.

Fluid communication may be effected between the riser conduit and the flowline through the root end of the riser conduit, through a corresponding end of the flowline and/or through an intermediate coupling at the corresponding end of the flowline. The intermediate coupling may, for example, be bent or pivoted when lifting the free end of the riser conduit away from the elongate support.

Fluid communication between the riser conduit and the flowline is preferably established before lowering the riser conduit and the elongate support to the seabed location.

The free end of the riser conduit may be lifted while holding the root end of the riser conduit with a structure, such as a towhead, that is joined to a corresponding end of the elongate support.

Preliminarily, the riser conduit may be attached to the exterior of a carrier pipe that surrounds the flowline of the elongate support. The riser conduit may be towed to above the seabed location when piggybacked to the elongate support. In that case, the riser conduit and the elongate support may be towed together with a towhead that holds the root end of the riser conduit and that is joined to a corresponding end of the elongate support. The towhead may be a leading towhead, towed ahead of the riser conduit and the elongate support.

A detached portion of the riser conduit is preferably laid on the seabed on a curved lay path that leads away from the elongate support toward the riser support.

After lifting one riser conduit, the free end of at least one other riser conduit may be detached from the same elongate support and lifted to the riser support.

The inventive concept extends to an assembly for use in constructing a subsea riser. The assembly comprises at least one riser conduit that extends from a coupled root end to an uncoupled free end, which may be fitted with a pull head. The riser conduit is held by subsea-releasable attachments in piggybacked relation along an elongate support that comprises at least one flowline.

A hinge structure that effects fluid communication between the riser conduit and the flowline may be provided at the root end of the flowline. The hinge structure is arranged to move when pivoting the riser conduit away from the elongate support. For example, the hinge structure may comprise a flexible loop of pipe, or a pivot coupling.

The assembly may include an end structure such as a towhead that supports the root end of the riser conduit and that is joined to the elongate support.

In embodiments to be described, the elongate support is a pipeline bundle, the flowline is one of the pipes of the bundle and the riser conduit is held against an external carrier pipe of the bundle.

The riser conduit may be substantially shorter than the elongate support. In that case, the root end of the riser conduit may be substantially aligned with a corresponding end of the elongate support and the free end of the riser conduit may be substantially spaced from an opposite end of the elongate support.

The riser conduit is apt to be made of flexible pipe or polymer composite pipe. Conversely, the elongate support is apt to be made of rigid pipe or polymer composite pipe.

The inventive concept also extends to a subsea riser system comprising the assembly of the invention. In that system, the riser conduit, with its free end now detached from the elongate support remaining at the seabed location, extends from the seabed location to a riser support, such as an FPSO, a platform, or a buoy, positioned at or near to the surface of the sea.

A detached portion of the riser conduit may lie on the seabed on a curved lay path that leads away from the elongate support toward the riser support. The curved lay path preferably departs or deviates from the longitudinal direction of the elongate support at a position spaced from the root end of the riser conduit.

The invention simplifies the installation of risers, particularly risers connected to pipeline bundles, and reduces congestion on the seabed close to the bottom of the riser.

GB 2537360, to a sister company of the Applicant, teaches installing a direct electrical heating system by pre-connecting electrical cables to a subsea pipeline during installation. The cables are piggybacked onto the pipeline. The cables are detached from the pipeline on the seabed and their ends are lifted temporarily to the surface to make electrical connections before being returned quickly to the seabed.

The teaching of GB 2537360 is not relevant to installing a fluid-carrying riser. In this respect, the arrangement disclosed in GB 2537360 requires a separate, conventional riser to convey fluids from and to the pipeline. Also, all of the elongate elements that are connected in GB 2537360 are external to the pipeline. In any case, a cable has a much smaller minimum bending radius (MBR) than a typical pipe; consequently, no more than minimal provisions are required to control its curvature.

Embodiments of the invention implement a method for installing at least one riser for connecting a subsea fluid transport system, which system comprises at least one flowline, to a floater on or near the water surface. The method comprises the following steps: fluidly connecting a first end of the riser to a connection structure itself connected to the first end of said flowline; attaching the riser along the outer casing of the flowline in temporary piggy-back arrangement; deploying the flowline underwater; and recovering the second end of the riser and detaching the riser from the flowline for lifting the second end of the riser toward the floater.

The connection structure may, for example, be a manifold. The riser may be fluidly connected to the flowline before installation, through piping in the manifold structure. The piping in the manifold structure may, for example, comprise a loop.

Recovery of the riser from the flowline on the seabed implies creating a loop or bend on the seabed with a radius of curvature that is greater than the MBR of the riser. For example, for a flexible pipe, the radius of curvature of any loop or bend of the riser in the system may be greater than three times the outer diameter of the riser.

The subsea fluid transport system may comprise a group or bundle of flowlines. That bundle of flowlines may be enclosed in an external carrier pipe.

Installation of the subsea fluid transport system suitably involves towing. In that case, the system may conveniently be prepared for installation onshore and/or nearshore. A leading towhead may serve as the connection structure.

At least two risers fluidly connected to at least two flowlines of the bundle may be installed by the method of the invention.

The riser may be a flexible pipeline, a rigid steel pipeline or a composite pipeline, for example of TCP.

Embodiments of the invention provide a riser system for connecting at least two flowlines of a bundle to the surface, the system comprising: a base structure combined with the towhead of the bundle, comprising a piping arrangement for fluidly connecting the at least two flowlines to at least two risers; and at least two risers wherein at least one riser laterally exits the base structure on the same side as the flowlines. One of the flowlines may be exclusively connected fluidly to one of the risers.

In summary, a subsea riser of the invention is installed by lowering at least one riser conduit to the seabed when piggybacked to an elongate support that comprises at least one flowline. The elongate support may be a pipeline bundle, which may be attached to one or more towheads in a towable bundle unit. The riser conduit may be in fluid communication with the flowline.

At the seabed, a free end portion of the riser conduit is detached from the elongate support by releasing subsea-releasable fastenings. Then, with the elongate support and a root end of the riser remaining at the seabed, the detached free end portion of the riser conduit is lifted away from the elongate support to a riser support, such as a platform, an FPSO or a buoy.

BRIEF DESCRIPTION OF THE SEVERAL VIEWS OF THE DRAWINGS

In order that the invention may be more readily understood, reference will now be made, by way of example, to the accompanying drawings in which.

DETAILED DESCRIPTION OF THE INVENTION

Figure 1:
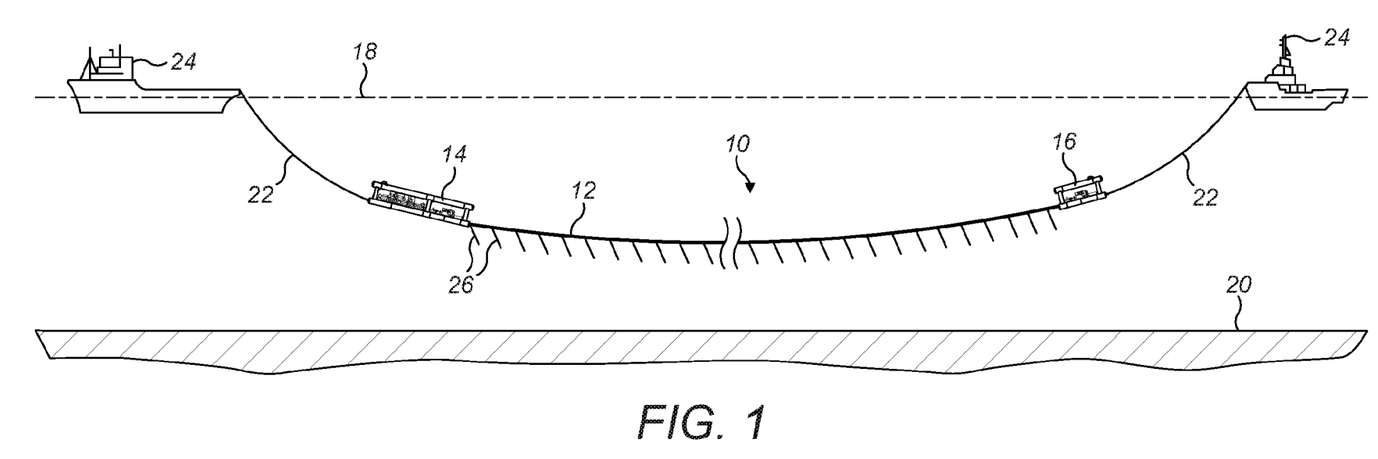
FIG. 1 is a schematic side view of a bundle unit comprising a pipeline bundle of the invention and two towheads, shown here being towed to a subsea installation site using the controlled depth towing method known in the prior art.
Figure 2:
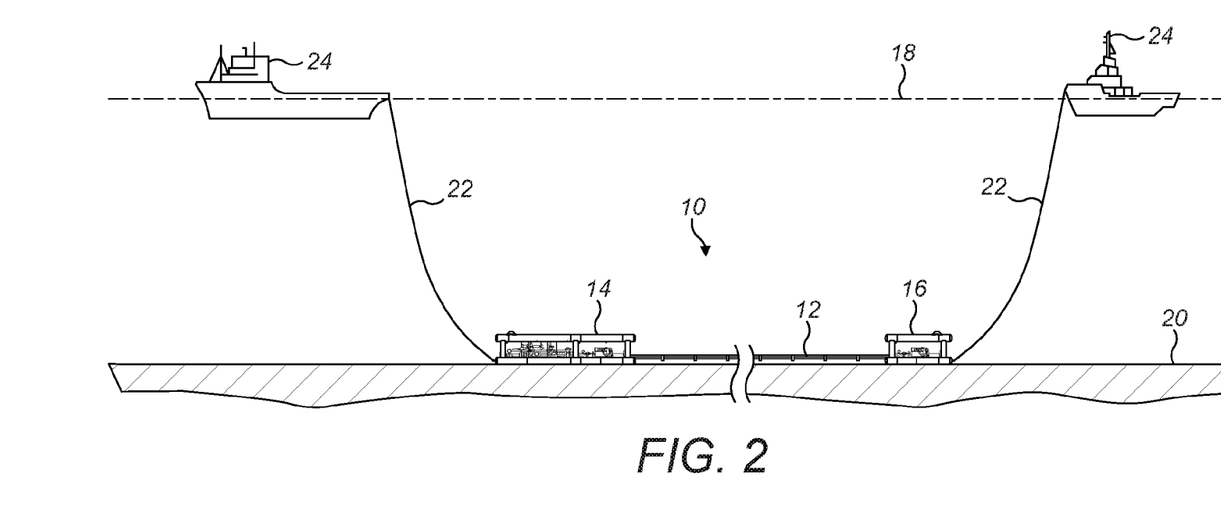
FIG. 2 is a schematic side view of the bundle unit of FIG. 1 now landed on the seabed.

FIGS. 1 and 2 of the drawings show a towable pipeline bundle unit 10 of the invention. The bundle unit 10 comprises a pipeline bundle 12 that connects a leading towhead 14 to a trailing towhead 16.

The bundle unit 10 is shown in FIGS. 1 and 2 both interrupted and shortened. Also, the depth of the water between the surface 18 and the seabed 20 will generally be greater than these schematic views would suggest.

The bundle unit 10 provides a robust, efficient and easily-installed subsea flowline system. For example, the bundle unit 10 may be installed in an oil or gas field to connect or 'tie back' subsea production wells or manifolds to host facilities or to subsea tie-in points.

Typically, the bundle unit 10 is a few kilometres in length. If a longer tie-back is needed, two or more bundle units 10 or pipeline bundles 12 may be connected together in longitudinal succession in a 'daisy-chain' arrangement.

A bundle unit 10 like that shown in FIGS. 1 and 2 is fabricated by welding together pipe components at a coastal yard such as a spoolbase. There, the bundle unit 10 is typically disposed end-wise to the shoreline and so extends a few kilometres inland. Once the completed bundle unit 10 has been tested and commissioned, it is launched by being pulled longitudinally into the sea. Alternatively, some fabrication, testing and commissioning operations may be performed in sheltered nearshore or inshore waters.

The towheads 14, 16 incorporate buoyancy, or provide for buoyancy to be attached, to offset at least some of their weight during towing. Optionally, the pipeline bundle 12 may also contribute some buoyancy to the bundle unit 10 by virtue of air or other gas contained within a sealed carrier pipe. Additional external buoyancy may also be provided on, or attached to, a carrier pipe, a core pipe or other pipes of the pipeline bundle 12.

Various towing methods may be used to transport the unit 10 to an offshore installation site. In particular, the bundle unit 10 may be towed at various depths in the water. The choice of towing depth involves a trade-off between various factors. For example, the bundle unit 10 may be surface-towed at or near to the surface 18, which is easiest to manage. However, surface water dynamics may generate fatigue in the pipeline bundle 12, which is the limiting factor that determines the allowable tow distance. Conversely, towing near the seabed 20 protects the pipeline bundle 12 from the influence of surface water dynamics and limits risks during subsequent lowering to the seabed 20 at the installation site. However, controlling the bundle unit 10 at depth is more challenging and is only feasible if the contours of the seabed 20 permit.

FIG. 1 shows the preferred option of a mid-water towing method in which the bundle unit 10 is towed at an intermediate depth in the water column between the surface 18 and the seabed 20. Here, the bundle unit 10 is safely clear of the contours of the seabed 20 and yet is beneath significant influence from wave action near the surface 18. Specifically, FIG. 1 shows a favoured mid-water towing method known in the art as the 'controlled-depth towing method' or CDTM, as described in U.S. Pat. No. 4,363,566.

Mid-water towing is a good compromise that ensures low-stress installation without the use of large and expensive crane vessels that depend on low sea states. This makes installation less weather-sensitive and reduces the cost of installation vessels significantly. However, mid-water towing requires precise management of buoyancy.

In all towing methods, the bundle unit 10 is held in tension by chains or lines 22 extending fore and aft from the respective towheads 14, 16 to respective installation vessels such as tugs 24. The pipeline bundle 12 acts in tension between the towheads 14, 16 during towing, with tensile loads being borne principally by a carrier pipe or core pipe of the bundle 12 as will be shown in FIGS. 3 to 5.

The speeds of, and spacing between, the tugs 24 are adjusted to keep the bundle unit 10 at the required depth having regard to the effect of drag forces and tension in the chains 22.

In the CDTM, the pipeline bundle 12 is made slightly negatively buoyant at the required depth by the addition of buoyancy and/or ballast spaced along its length. In the example shown, ballast chains 26 spaced along the pipeline bundle 12 add weight that offsets its buoyancy. As a result of the added ballast weight, the pipeline bundle 12 hangs between the towheads 14, 16 as a catenary.

When the unit 10 reaches an installation site, the bundle unit 10 is lowered toward the seabed 20 by removing external buoyancy or by adding ballast while the lines 22 are paid out from the tugs 24. The bundle unit 10 then settles on the seabed 20 as shown in FIG. 2, with the pipeline bundle 12 resting on and supported by the seabed 20 between the towheads 14, 16.

Some pipeline bundle configurations place the flowline pipes and other elongate elements around a carrier pipe that serves as a structural spine. Other pipeline bundle configurations enclose the flowline pipes and other elongate elements within a carrier pipe that surrounds and encloses them. In this respect, FIGS. 3 to 5 illustrate a pipeline bundle 12 of the invention that exemplifies the latter arrangement, although the former arrangement is not excluded from the broad inventive concept.

Figure 3:
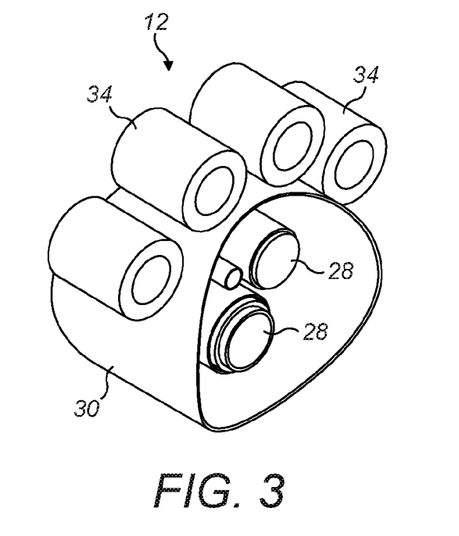
FIG. 3 is a cut-away perspective view of a pipeline bundle of the invention.
Figure 4:
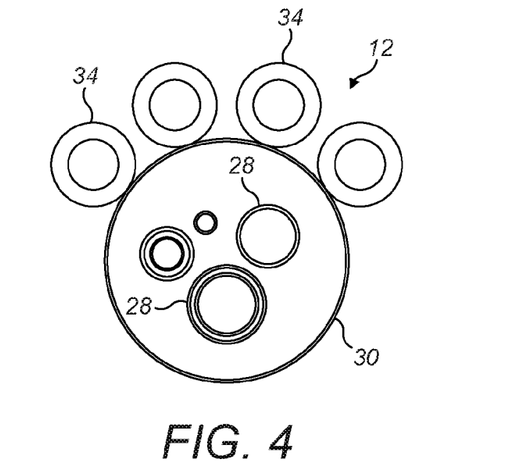
FIG. 4 is a cross-sectional view of the pipeline bundle shown in FIG. 3.
Figure 5:
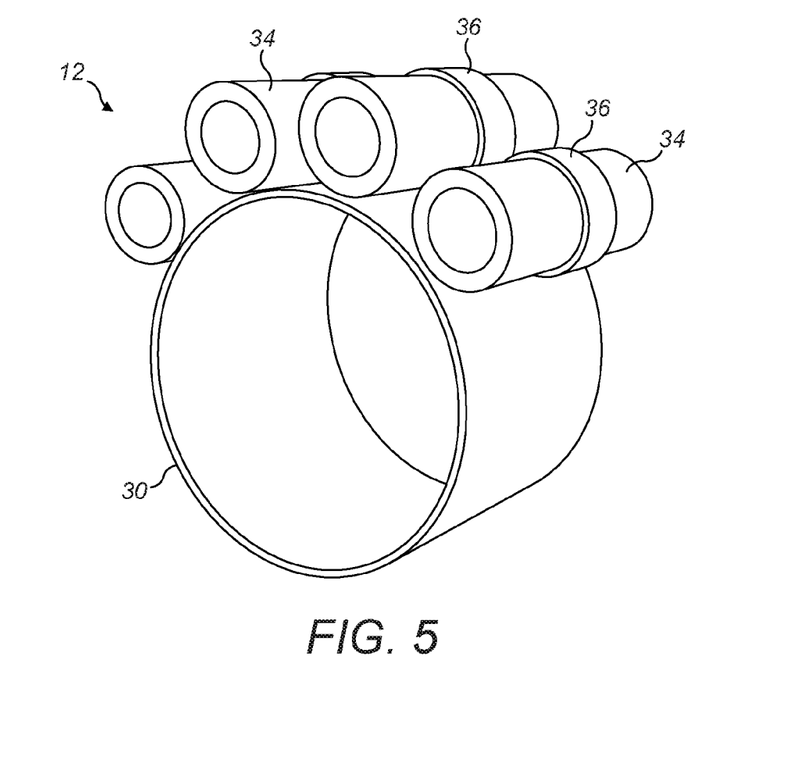
FIG. 5 is a further perspective view of the pipeline bundle shown in FIGS. 3 and 4, also showing retainers for holding riser conduits temporarily on a carrier pipe of the bundle.
Figure 6:
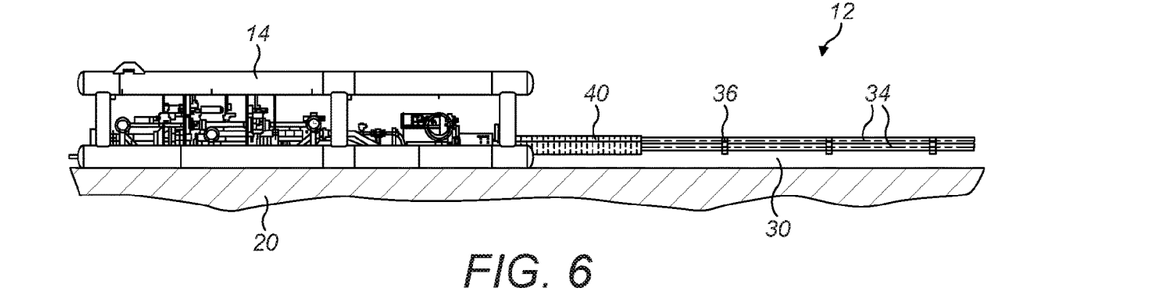
FIG. 6 is a side view of a leading towhead of the bundle unit and an adjoining end of the pipeline bundle on the seabed.
Figure 7:
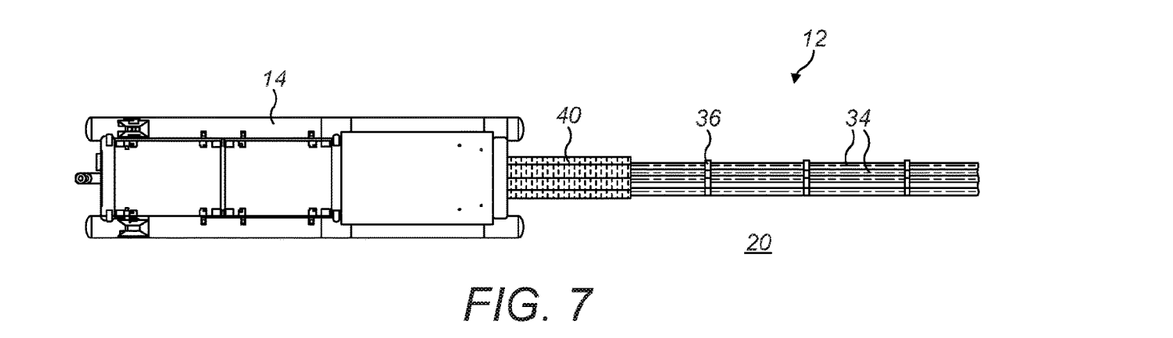
FIG. 7 is a top plan view of the leading towhead and the adjoining end of the pipeline bundle shown in FIG. 6.

In the pipeline bundle 12 shown in FIGS. 3 and 4, a group of parallel inner pipes 28 are contained within, and extend along, an external carrier pipe 30 to serve as conduits for various fluids. FIG. 5 shows the carrier pipe 30 but omits the inner pipes 28. The inner pipes 28 will typically include a production flowline for conveying hydrocarbon production fluids from a subsea well and other conduits for conveying other fluids, some in contra-flow. Examples of such other fluids are water for injection into the well, gas for a gas-lift system and chemical additives for flow assurance. Cables for transmitting power and data between the towheads 14, 16 may also be included in the bundle unit 10 but have been omitted from this simplified view.

The inner pipes 28 have different dimensions and constructions in accordance with the characteristics, pressures and flow rates of the fluids they are required to carry. For example, the production flowline will typically have the largest inner diameter among the inner pipes 28 and may have pipe-in-pipe (PiP) construction for thermal insulation.

Eventually, the inner pipes 28 of the pipeline bundle 12 on the seabed 20 must communicate with the surface 18, either to deliver production fluids to a surface installation 32, such as a platform as shown in FIGS. 11 to 16, or to receive other fluids that are required to support production. Communication with the surface installation 32 is effected by a corresponding group of riser conduits 34, each of which is in fluid communication with a respective one of the inner pipes 28.

By way of example, the diameter of the pipeline bundle 12, as defined by the diameter of the carrier pipe 30, may typically be between twenty-four inches and fifty-four inches (between 60.1 cm and 137.1 cm) whereas the riser conduits 34 may typically have a diameter of less than ten inches (25.4 cm) and preferably six inches (15.24 cm).

In this example, fluid communication between each inner pipe 28 and the associated riser conduit 34 is effected by fixed, rigid pipework via a manifold or hub in the towhead 14 where the inner pipe 28 emerges at the end of the pipeline bundle 12. That pipework reverses the flow direction from the inner pipe 28 to the riser conduit 34 or vice versa.

In accordance with the invention, the riser conduits 34 are installed with the pipeline bundle 12 as part of the bundle unit 10 that is towed and lowered as shown in FIGS. 1 and 2. Thereafter, the riser conduits 34 are at least partially detached from the pipeline bundle 12 and their free ends are deployed from the bundle unit 10 for connection to the surface installation 32 with the required riser configuration.

Thus, each riser conduit 34 has a root end in the towhead 14 at one end of the pipeline bundle 12 and a free end that is initially supported at a location along the length of the pipeline bundle 12. The root end of the riser conduit 34 will be at the bottom of the completed riser, at the interface between the riser conduit 34 and the corresponding inner pipe 28 of the pipeline bundle 12. Conversely, when lifted to the surface 18, the free end of the riser conduit 34 becomes the top end of the completed riser.

Specifically, the riser conduits 34 are piggybacked on the carrier pipe 30, extending in parallel along the exterior of the pipeline bundle 12 from the towhead 14. FIG. 5 shows the riser conduits 34 held against the outside of the carrier pipe 30 by subsea-releasable retainers 36 such as clamps, straps or other fastenings. Such retainers 36 are suitably distributed at intervals along the length of the carrier pipe 30 as shown in FIGS. 6 to 10. In principle, the retainers 36 may be like the corresponding items used for piggybacking cables in the aforementioned GB 2537360.

The riser conduits 34 need not extend along the full length of the pipeline bundle 12; they need only be as long as may be demanded by the water depth at the installation site and the shape and configuration that is required for the completed riser. The riser conduits 34 are shown in this example as being of the same diameter and construction as each other but in practice they may have different dimensions and constructions, for example to correspond to the associated inner pipes 28 to which they are coupled.

In this example, the riser conduits 34 are made of unbonded flexible pipe. In principle, however, the riser conduits 34 could be of rigid steel construction or of a polymer composite material, provided that an appropriate MBR is observed.

Figure 8:
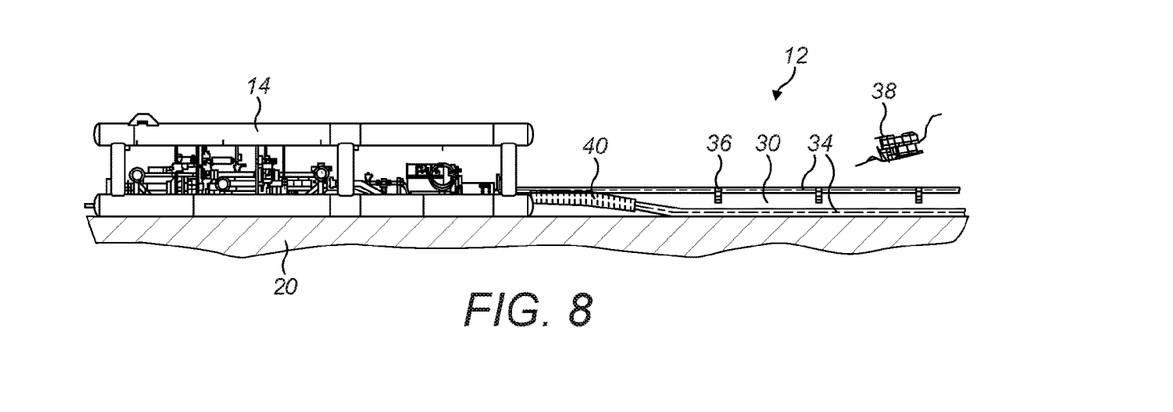
FIG. 8 corresponds to FIG. 6 but shows one of the riser conduits detached from the carrier pipe while remaining attached at one end to the towhead.
Figure 9:
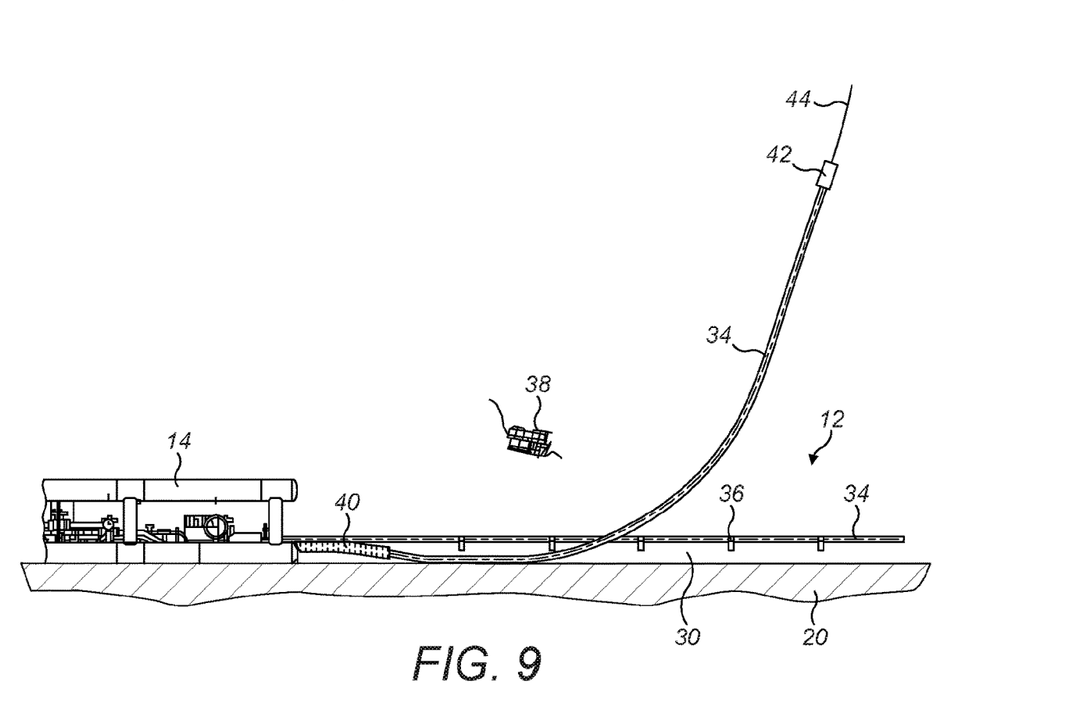
FIG. 9 corresponds to FIG. 8 but shows the riser conduit detached from the carrier pipe now being lifted away from the seabed.

FIGS. 8 and 9 show a work-class ROV 38 attending the pipeline bundle 12 on the seabed 20, having detached an outer one of the riser conduits 34 from its series of retainers 36 on the carrier pipe 30. That riser conduit 34 can now be laid at least partially on the seabed 20 as shown. The riser conduit 34 bends helically around the carrier pipe 30 close to their mutual interface with the towhead 14. A bend restrictor 40 around the riser conduit 34 at this location controls consequential bending stress experienced by the riser conduit 34, particularly where rigid pipework connects the riser conduit 34 to the corresponding inner pipe 28 within the carrier pipe 30.

FIG. 9 shows the free end of the riser conduit 34 now being lifted away from the seabed 20, leaving a portion of the riser conduit 34 close to the towhead 14 in contact with the seabed 20. At its free end, the riser conduit 34 terminates in a pull head 42 that includes a topside end fitting flange. The pull head 42 is coupled to a lifting wire 44 that is suspended from a surface vessel, as will be seen in FIGS. 13 to 15.

Figure 10:
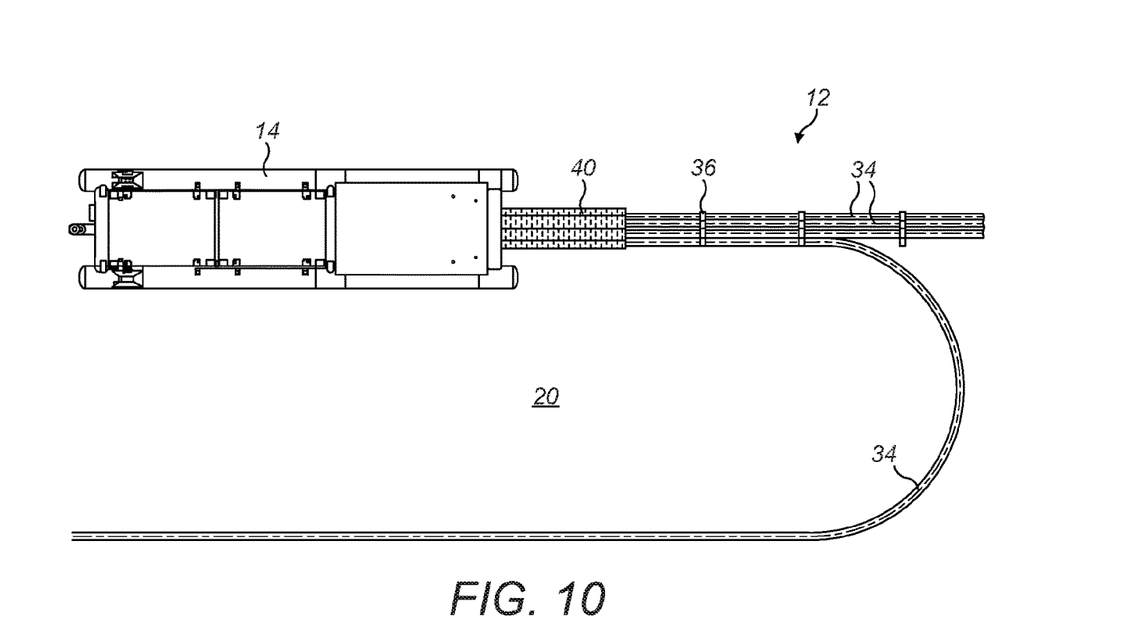
FIG. 10 is a top plan view corresponding to FIG. 7 but showing the riser conduit detached from the carrier pipe now laid on the seabed beside the towhead on a heading that extends toward a buoyant riser support such as a platform.
Figure 11:
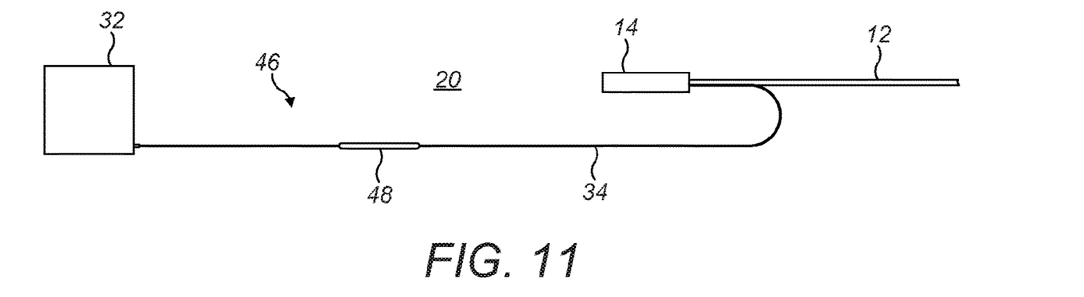
FIG. 11 is a schematic top plan view of the riser conduit as part of a riser installation extending from the towhead to the platform.

The ROV 38 remains in attendance to monitor the lifting operation and the subsequent laying operation as a static lower portion of the riser conduit 34 is laid progressively away from the towhead 14 in a curved configuration on the seabed 20, as shown in FIG. 10. The objective of this curved lay operation is to approach the heading with respect to the towhead 14 that is required for the riser 46 to extend to the surface installation 32 as shown in FIG. 11.

To minimise stress on the riser conduit 34 due to installation loads or snap forces during the lifting operation, the curved lower portion of the riser conduit 34 should not start too close to the towhead 14. Similarly, the riser conduit 34 should not be lifted from the seabed 20 too close to the towhead 14. Thus, the riser conduit 34 is preferably kept substantially parallel to the pipeline bundle 12 for a minimum distance from the towhead 14 of, say, ten to thirty metres.

An appropriate MBR must be observed for the curved lower portion of the riser conduit 34. The bend radius of that curved lower portion may, for example, be between about fifteen metres and forty metres. Optionally, a turning aid may be used on the curved lower portion of the riser conduit 34. If used, a turning aid may allow a bend radius toward the smaller end of the suggested range.

In this example, the surface installation 32 is substantially aligned with the longitudinal axis of the pipeline bundle 12, at a position beyond the towhead 14. This allows space for the riser 46 to be installed between moorings of the surface installation 32, which have been omitted from the simplified schematic view of FIG. 11. Consequently, the riser 46 curves through about 180° on the seabed 20 to reach the required heading.

Other riser conduits 34 that, subsequently, are similarly detached from the pipeline bundle 12 and lifted to the surface installation 32 to form additional risers could have different degrees of curvature or radii of curvature on the seabed 20. In principle, of course, the riser 46 could remain in the orientation shown in FIG. 9, without curved lay, if the surface installation 32 was on the appropriate heading relative to the pipeline bundle 12.

Figure 12:
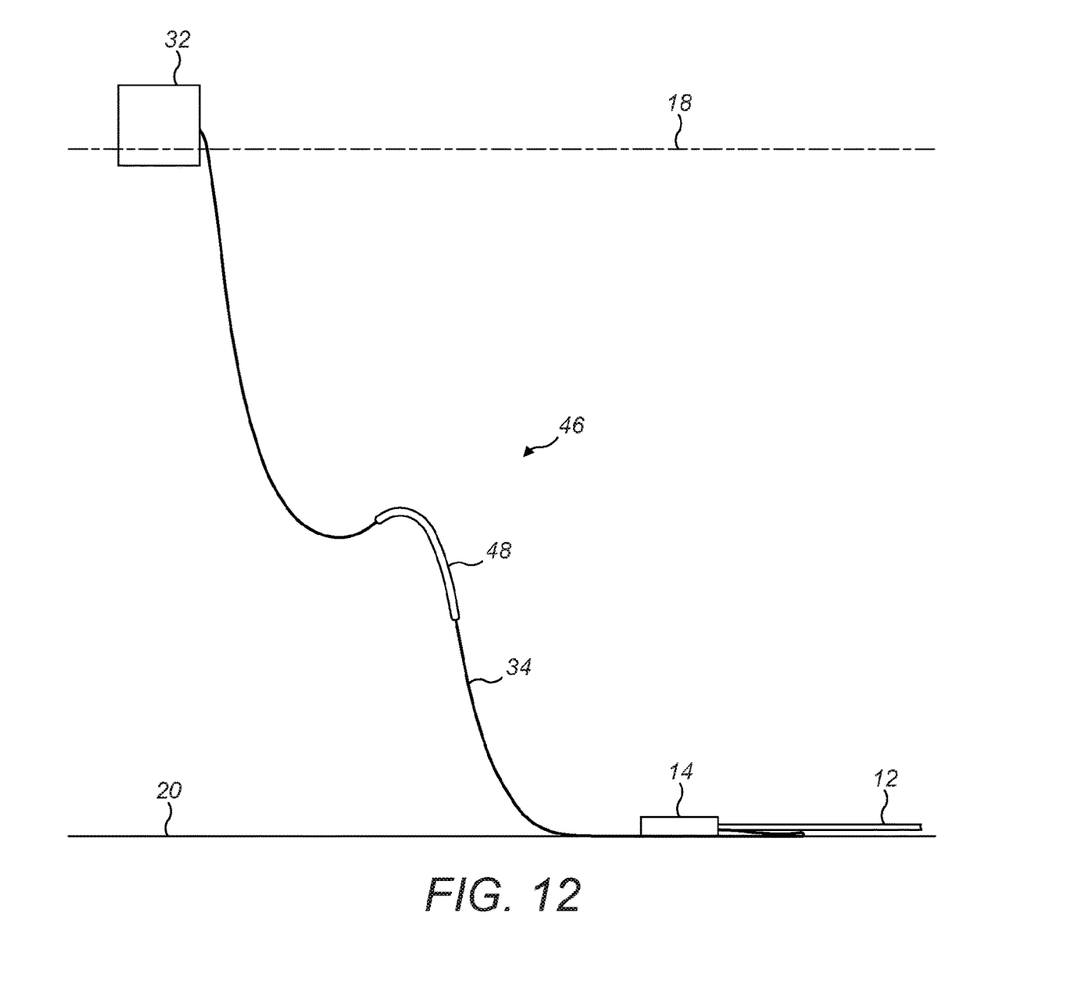
FIG. 12 is a schematic side view of the riser installation shown in FIG. 11, showing the riser conduit in an optional lazy wave configuration.

With reference additionally now to FIG. 12, the riser 48 has a lazy wave configuration in this example. In that configuration, distributed buoyancy modules 48 are fitted around the riser conduit 34 at an intermediate position along the riser conduit 34. The localised upthrust of those buoyancy modules 48 creates inflections in the riser conduit 34 that impart an intermediate hogbend shape as shown.

Figure 13:
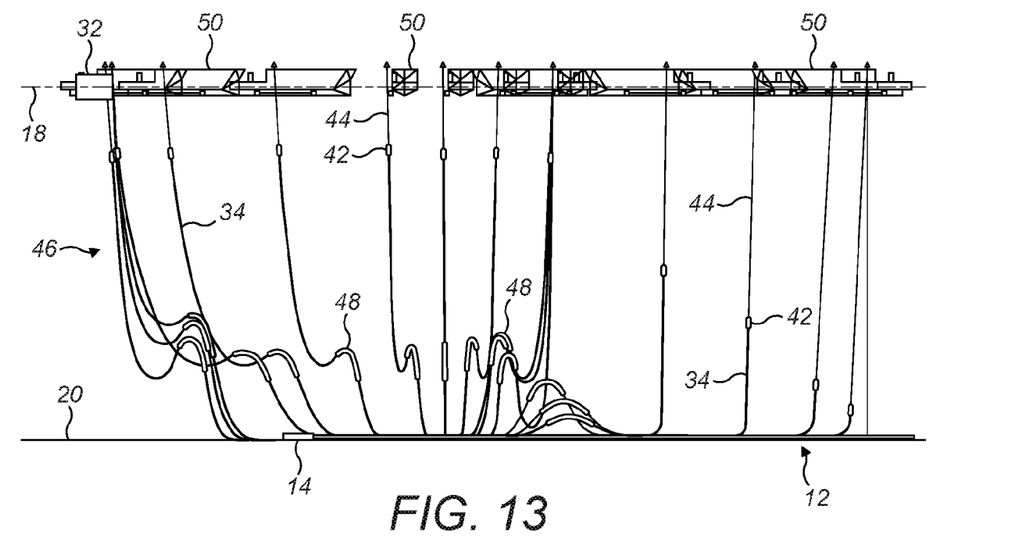
FIG. 13 is a side view of a lift sequence of the riser conduit from the pipeline bundle into the lazy wave configuration shown in FIG. 12.
Figure 14:
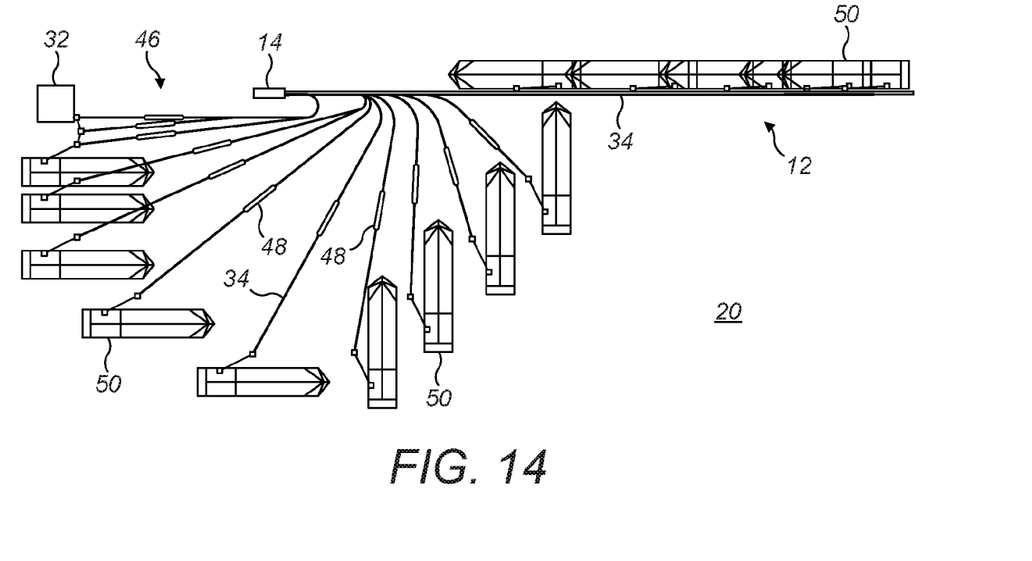
FIG. 14 is a plan view corresponding to FIG. 13.

FIGS. 13 and 14 show how a vessel 50 at the surface 18 may be used to lift the riser conduit 34 via the pull head 42 and the lifting wire 44, which is suitably suspended from a main crane of the vessel 50. In particular, FIGS. 13 and 14 show a sequence of steps, from right to left, in which the vessel 50 first picks up the free end of the riser conduit 34 and then lifts a free end portion of the riser conduit 34 off the seabed 20. A major portion of the riser conduit 34 initially remains on the seabed 20 until the hogbend shape is formed by adding buoyancy modules 48 to that portion. Then, the lifting operation continues as the vessel 50 turns and moves across the surface 18 toward the surface installation 32 along an approximately semi-circular path to perform the curved lay operation.

Figure 15:
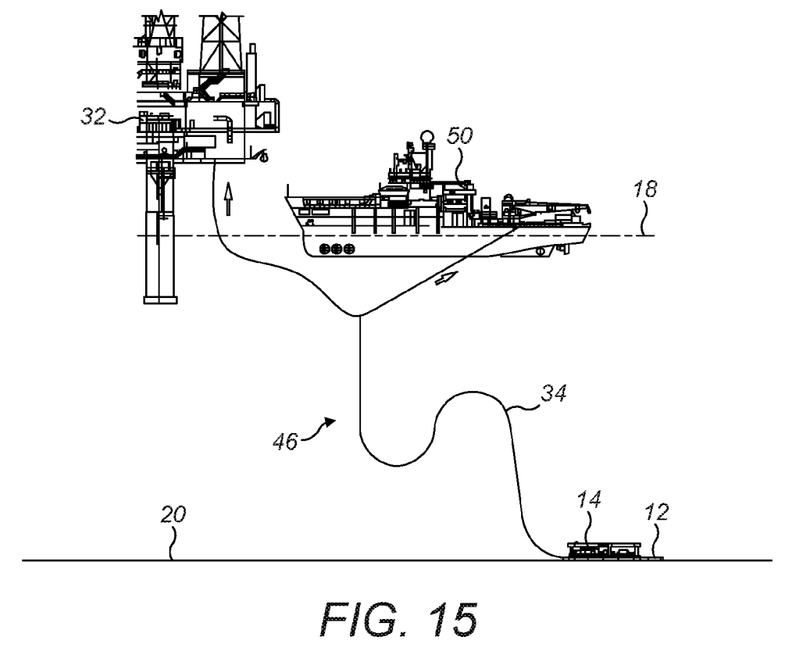
FIG. 15 is a side view of a topside end fitting of the riser conduit being handed over to the platform.
Figure 16:
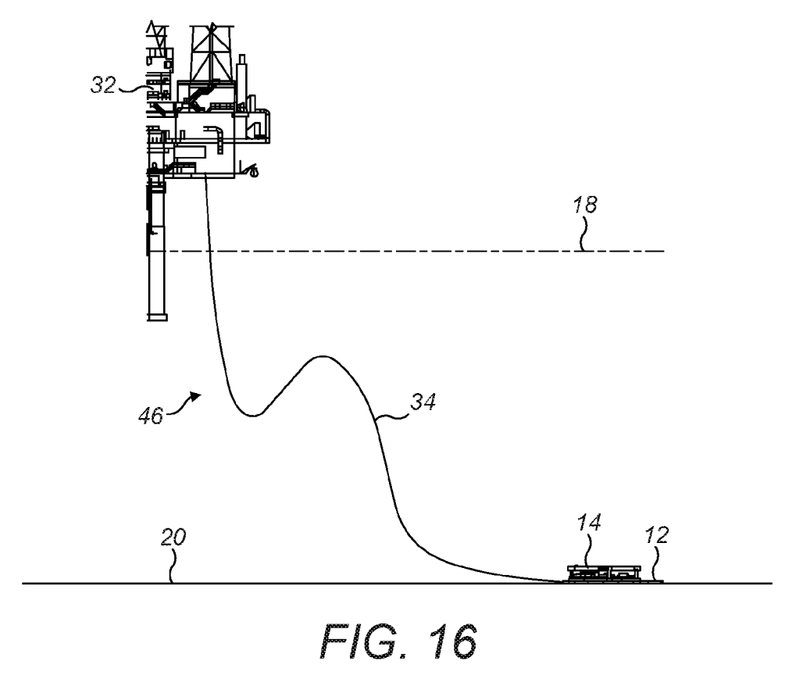
FIG. 16 corresponds to FIG. 15 but shows the riser conduit now coupled to the platform for fluid communication.

At the end of the lifting and laying operation, as also shown in FIG. 15, the vessel 50 hands over the top end of the riser 46 to the surface installation 32. This leaves the riser 46 connected to the surface installation 32 as shown in FIG. 16. A similar series of operations may then be performed to lift and position the other riser conduits 34 that remain attached to the pipeline bundle 12 on the seabed 20.

Figure 17:
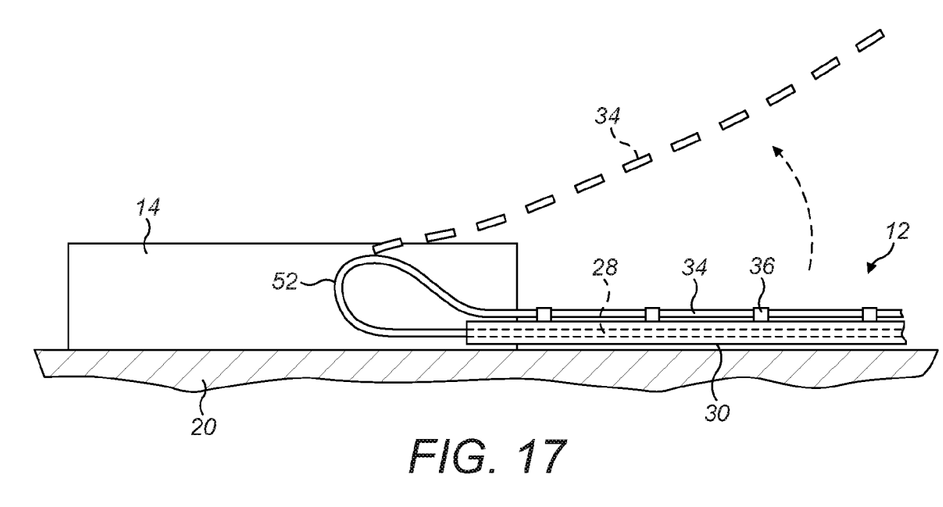
FIG. 17 is a schematic side view of a towhead and the adjoining end of a pipeline bundle, illustrating a variant of the invention in which a riser conduit is coupled to a corresponding flowline of the bundle by a loop of flexible pipe.
Figure 18:
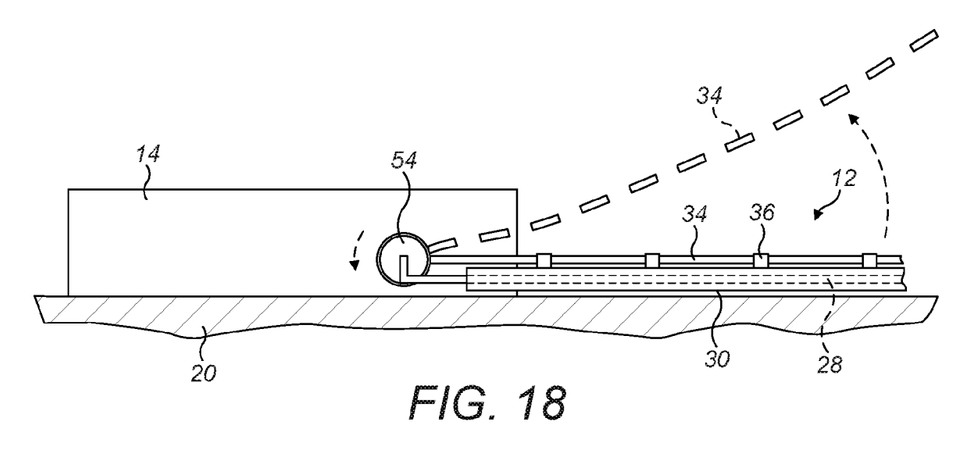
FIG. 18 corresponds to FIG. 17 but shows a further variant of the invention in which a riser conduit is coupled to a corresponding flowline of the bundle by a swivel coupling.

Finally, the schematic views of FIGS. 17 and 18 show alternatives to the use of rigid pipework in the towhead 14 to connect a riser conduit 34 to the corresponding inner pipe 28 within the carrier pipe 30. Several other features shown in these drawings remain as before. Like numerals are therefore used for those like features.

In FIG. 17, an enlarged loop 52 of pipe connects the riser conduit 34 to the corresponding inner pipe 28. That loop 52 is sufficiently large to observe the MBR of the pipe from which it is made. This allows that pipe to flex without risk of failure as the riser conduit 34 is lifted away from the carrier pipe 30 of the pipeline bundle 12, as shown here in dashed lines, and the loop 52 opens in consequence. The loop 52 of pipe may, for example, be made of bonded or unbonded flexible pipe or of TCP. The loop 52 may be integral with the riser conduit 34 and/or with the corresponding inner pipe 28, or may comprise a separate piece of pipe.

In FIG. 18, the riser conduit 34 extends from a swivel coupling 54 on the towhead 14. The swivel coupling 54 pivots as the riser conduit 34 is lifted away from the carrier pipe 30 of the pipeline bundle 12, as also shown here in dashed lines. The swivel coupling 54 is in fluid communication with both the riser conduit 34 and the corresponding inner pipe 28 in order to effect fluid communication between them.

Many other variations are possible within the inventive concept. For example, in the embodiments illustrated, each inner pipe within the carrier pipe has a respective counterpart among the riser conduits that are fastened temporarily to the exterior of the carrier pipe. However, the number of riser conduits on the pipeline bundle need not necessarily match the number of inner pipes in the pipeline bundle. For example, some of the riser conduits may be dedicated to servicing functions on board a towhead, such as processing or conditioning the production fluids, and so need not be coupled directly to an inner pipe of the bundle.

The invention has particular benefits when used with a multi-conduit pipeline bundle and especially when used with a bundle unit in which a pipeline bundle is joined to one or more towheads as described above. However, the invention may also have benefit when used with a single or unbundled flowline, whether or not the flowline is joined to a termination structure or other pipeline accessory that facilitates fluid communication between the flowline and the piggybacked deployable riser conduit.

The invention claimed is:

1. A method of installing a subsea riser, the method comprising:
lowering at least one riser conduit to a seabed location when piggybacked to an elongate support that comprises at least one flowline;
effecting fluid communication between the at least one riser conduit and the at least one flowline through a root end of the at least one riser conduit;
at the seabed location, detaching a free end of the at least one riser conduit from the elongate support; and
while leaving the elongate support and the root end of the at least one riser conduit at the seabed location, lifting the detached free end of the at least one riser conduit away from the elongate support to a riser support that is positioned at or near to the surface of the sea.

2. The method of claim 1, comprising effecting fluid communication between the at least one riser conduit and the at least one flowline through a corresponding end of the at least flowline.

3. The method of claim 2, comprising effecting fluid communication between the at least one riser conduit and the at least one flowline through an intermediate coupling at the corresponding end of the at least one flowline.

4. The method of claim 3, comprising bending or pivoting the intermediate coupling when lifting the free end of the at least one riser conduit away from the elongate support.

5. The method of claim 1, comprising establishing fluid communication between the at least one riser conduit and the at least flowline before lowering the at least one riser conduit and the elongate support to the seabed location.

6. The method of claim 1, comprising lifting the free end of the at least one riser conduit while holding the root end of the at least one riser conduit with a structure that is joined to a corresponding end of the elongate support.

7. The method of claim 1, further comprising the preliminary step of attaching the at least one riser conduit externally along a carrier pipe that surrounds the at least one flowline of the elongate support.

8. The method of claim 1, further comprising the preliminary step of towing the at least one riser conduit to above the seabed location when piggybacked to the elongate support.

9. The method of claim 8, comprising towing the at least one riser conduit and the elongate support together with a towhead that holds the root end of the at least one riser conduit and that is joined to a corresponding end of the elongate support.

10. The method of claim 9, comprising towing the towhead ahead of the at least one riser conduit and the elongate support.

11. The method of claim 1, comprising laying a detached portion of the at least one riser conduit on the seabed on a curved lay path that leads away from the elongate support toward the riser support.

12. The method of claim 1, comprising detaching a free end of at least one other riser conduit from the same elongate support and lifting the detached free end of the at least one other riser conduit to the riser support.

13. An assembly for use in constructing a subsea riser, the assembly comprising:
at least one riser conduit that extends from a coupled root end to an uncoupled free end;
subsea-releasable attachments;
an elongate support that comprises at least one flowline; and
a hinge structure at a root end of the at least one flowline that effects fluid communication between the root end of the at least one riser conduit and the root end of the at least one flowline, and that is arranged to move when pivoting the at least one riser conduit away from the elongate support;
wherein the at least one riser conduit is held by the subsea-releasable attachments in piggybacked relation along the elongate support.

14. The assembly of claim 13, wherein the hinge structure comprises a flexible loop of pipe.

15. The assembly of claim 13, wherein the hinge structure comprises a pivot coupling.

16. The assembly of claim 13, further comprising an end structure that supports the root end of the at one riser conduit and that is joined to the elongate support.

17. The assembly of claim 16, wherein the end structure is a towhead.

18. The assembly of claim 13, wherein the elongate support is a pipeline bundle and the at least one flowline is a pipe of the pipeline bundle.

19. The assembly of claim 18, wherein the at least one riser conduit is held against an external carrier pipe of the pipeline bundle.

20. The assembly of claim 13, wherein the free end of the at least one riser conduit is fitted with a pull head.

21. The assembly of claim 13, wherein the at least one riser conduit is shorter than the elongate support.

22. The assembly of claim 21, wherein the root end of the at least one riser conduit is aligned with a corresponding root end of the at least one flowline of the elongate support and the free end of the at least one riser conduit is spaced from another end of the at least one flowline of the elongate support that is opposite the root end of the at least one flowline of the elongate support.

23. The assembly of claim 13, wherein the at least one riser conduit is of flexible pipe or polymer composite pipe.

24. The assembly of claim 13, wherein the elongate support is of rigid pipe or polymer composite pipe.

* * * * *